(12) United States Patent
Liu

(10) Patent No.: US 10,436,943 B2
(45) Date of Patent: Oct. 8, 2019

(54) BLUE-RAY RESISTING GLASS PROTECTION SHEET OF DISPLAY SCREEN

(71) Applicant: Bingzhang Liu, Shenzhen (CN)

(72) Inventor: Bingzhang Liu, Shenzhen (CN)

( * ) Notice: Subject to any disclaimer, the term of this patent is extended or adjusted under 35 U.S.C. 154(b) by 229 days.

(21) Appl. No.: 15/670,248

(22) Filed: Aug. 7, 2017

(65) Prior Publication Data
US 2017/0336536 A1 Nov. 23, 2017

Related U.S. Application Data

(63) Continuation of application No. PCT/CN2016/073017, filed on Jan. 31, 2016.

(30) Foreign Application Priority Data

Feb. 7, 2015 (CN) ............... 2015 2 0103019 U

(51) Int. Cl.
| | |
|---|---|
| *G02B 1/10* | (2015.01) |
| *B32B 17/06* | (2006.01) |
| *G02B 1/18* | (2015.01) |
| *C03C 17/34* | (2006.01) |
| *G02B 5/20* | (2006.01) |
| *C03C 17/00* | (2006.01) |

(52) U.S. Cl.
CPC ............... *G02B 1/10* (2013.01); *B32B 17/06* (2013.01); *C03C 17/34* (2013.01); *G02B 1/18* (2015.01); *G02B 5/208* (2013.01); *C03C 17/00* (2013.01); *C03C 2217/76* (2013.01); *C03C 2218/365* (2013.01)

(58) Field of Classification Search
CPC .. B32B 7/06; B32B 17/06; B32B 9/04; C03C 17/00; C03C 17/34; G02B 5/208; G02B 1/18
USPC .................. 359/359, 582; 428/601
See application file for complete search history.

(56) References Cited

U.S. PATENT DOCUMENTS

2015/0346392 A1* 12/2015 Lee ...................... C08J 5/18
428/601

* cited by examiner

*Primary Examiner* — Audrey Y Chang
(74) *Attorney, Agent, or Firm* — Erson IP (Nelson IP)

(57) ABSTRACT

A blue-ray resisting glass protection sheet of a display screen comprises a glass substrate (4). One side surface of the glass substrate (4) is atomized to form an atomization layer (1), an atomization surface of the atomization layer (1) is coated with a fingerprint resisting coating (3), the other side surface of the glass substrate (4) is coated with a blue-ray resisting coating (2), and an A/B glue layer (5) is bonded to a surface of the blue-ray resisting coating (2).

5 Claims, 1 Drawing Sheet

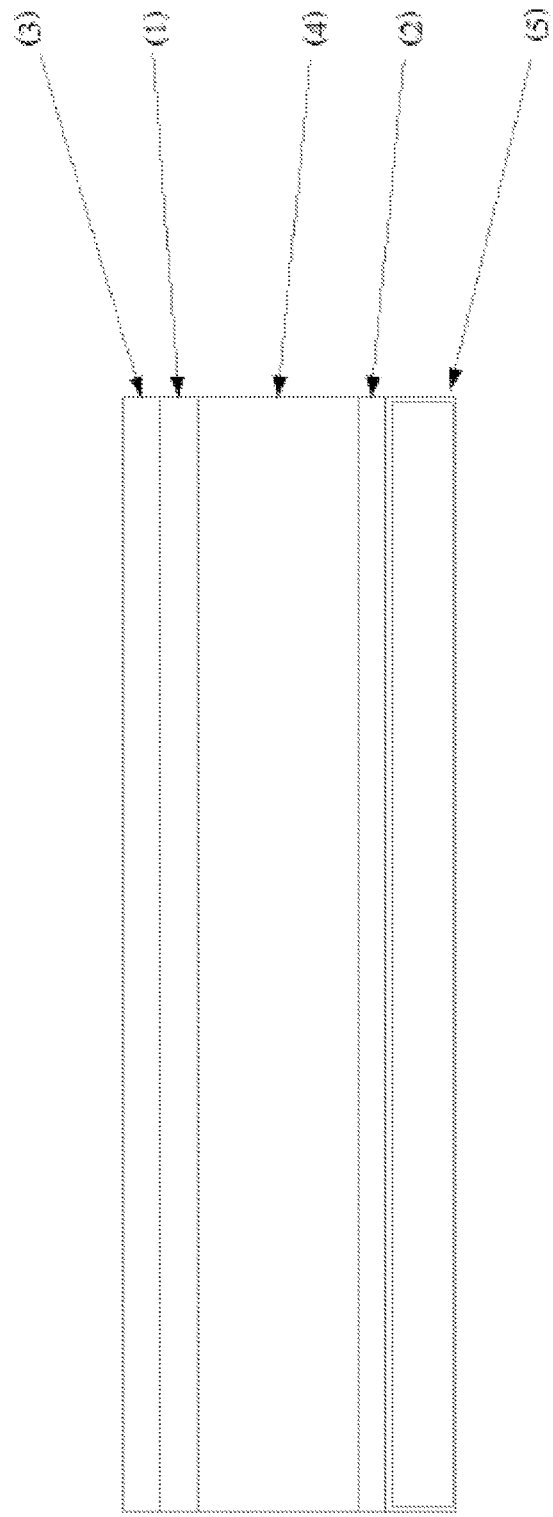

BLUE-RAY RESISTING GLASS PROTECTION SHEET OF DISPLAY SCREEN

CROSS-REFERENCE TO RELATED APPLICATIONS

This application is a continuation of International Patent Application No. PCT/CN2016/073017 with a filing date of Jan. 31, 2016, designating the United States, now pending, and further claims priority to Chinese Patent Application No. 201520103019.9 with a filing date of Feb. 7, 2015. The content of the aforementioned applications, including any intervening amendments thereto, are incorporated herein by reference.

TECHNICAL FIELD

The present invention relates to the fields of vacuum coating, electrochemical treatment of glass surfaces, chemical strengthening, etc., and particularly to a blue-ray resisting glass protection sheet of a display screen.

BACKGROUND OF THE PRESENT INVENTION

At present, a display screen on a market, regardless of passive display or active display, has a light-emitting waveband within a range of 380-780 nm, and short-waveband light having a light-emitting waveband within a range of 380-500 nm is also known as blue ray. Since the blue ray has an injury effect on human eyes and has a great injury to the human eyes particularly when ambient stray light in the night disappears, people generally feel eyestrain after viewing a display screen for long, particularly for people having a habit of night viewing. Therefore, how to effectively prevent the blue ray from injuring the human eyes to protect the human eyes is a technical problem to be urgently solved by those skilled in the art.

SUMMARY OF PRESENT INVENTION

With respect to the above defects, the present invention discloses a blue-ray resisting glass protection sheet of a display screen, capable of effectively preventing the blue ray from injuring the human eyes to protect the human eyes and also bringing a super-smooth touch feeling.

A blue-ray resisting glass protection sheet of a display screen is provided in the present invention, which comprises: a glass substrate; wherein one side surface of the glass substrate is atomized to form an atomization layer, an atomization surface of the atomization layer is coated with a fingerprint resisting coating, the other side surface of the glass substrate is coated with a blue-ray resisting coating, an A/B glue layer is bonded to a surface of the blue-ray resisting coating, and a surface of the fingerprint resisting coating is super smooth.

A range of a haze value of the atomization layer is 3%-13%.

Transmittance parameters of the blue-ray resisting coating are as follows: a corresponding transmittance at a wavelength of 380-400 nm is smaller than 45%; a corresponding transmittance at 450 nm is smaller than 45%; a corresponding transmittance at 480 nm is smaller than 70%; and a corresponding transmittance at a range of 550-650 nm is greater than 93%.

A thickness range of a film of the fingerprint resisting coating is 15-25 nm, a water contact angle is greater than 113°, and if repeated friction is performed for 3000 times on 0000# steel wool with a force of 1 kg load, the water contact angle is greater than 100°.

The glass substrate is made of any glass material of soda-lime glass, high aluminum glass, corning gorilla glass or borosilicate glass.

A surface friction coefficient of the fingerprint resisting coating is smaller than 0.02.

In the present invention, the blue-ray resisting glass protection sheet of the display screen can be bonded to the display screen through the A/B glue layer, thereby effectively preventing the blue ray from injuring the human eyes to protect the human eyes and also bringing a super-smooth touch feeling.

DESCRIPTION OF THE DRAWINGS

To describe technical solutions in the present invention more clearly, drawings to be used in embodiments will be described briefly below. Apparently, the drawings described below are only some embodiments of the present invention. For those ordinary skilled in the art, other drawings can also be obtained according to these drawings without contributing creative labor.

FIG. 1 is a structural diagram of a blue-ray resisting glass protection sheet of a display screen disclosed in the present invention.

DETAILED DESCRIPTION OF PREFERRED EMBODIMENTS

The technical solutions in the present invention will be clearly and fully described below in combination with the drawings in the present invention. Apparently, described embodiments are only some embodiments of the present invention, not all of the embodiments. All other embodiments obtained by those ordinary skilled in the art without contributing creative labor based on the embodiments in the present invention belong to the protection scope of the present invention.

The present invention discloses a blue-ray resisting glass protection sheet of a display screen, capable of effectively preventing the blue ray from injuring the human eyes to protect the human eyes and also bringing a super-smooth touch feeling. The present invention will be described in detail below in combination with specific embodiments.

FIG. 1 is a structural diagram of a blue-ray resisting glass protection sheet of a display screen disclosed in the present invention. As shown in FIG. 1, the blue-ray resisting glass protection sheet of the display screen disclosed in the present invention may include: a glass substrate 4. One side surface of the glass substrate 4 is atomized to form an atomization layer 1, an atomization surface of the atomization layer 1 is coated with a fingerprint resisting coating 3, the other side surface of the glass substrate 4 is coated with a blue-ray resisting coating 2, an A/B glue layer 5 is bonded to a surface of the blue-ray resisting coating 2 and a surface of the fingerprint resisting coating 3 is super smooth.

A range of a haze value of the atomization layer 1 is 3%-13%. A transmittance is controlled to be greater than 88%.

Transmittance parameters of the blue-ray resisting coating 2 are as follows: a corresponding transmittance at a wavelength of 380-400 nm is smaller than 45%; a corresponding transmittance at 450 nm is smaller than 45%; a corresponding transmittance at 480 nm is smaller than 70%; and a corresponding transmittance at a range of 550-650 nm is greater than 93%.

A thickness range of a film of the fingerprint resisting coating 3 is 15-25 nm, a water contact angle is greater than 113°, and if repeated friction is performed for 3000 times on 0000# steel wool with a force of 1 kg load, the water contact angle is greater than 100°.

The glass substrate 4 is made of any glass material of soda-lime glass, high aluminum glass, corning gorilla glass or borosilicate glass.

A surface friction coefficient of the fingerprint resisting coating 3 is smaller than 0.02.

In the present invention, the blue-ray resisting glass protection sheet of the display screen can be bonded to the display screen through the A/B glue layer 5, thereby effectively preventing the blue ray from injuring the human eyes to protect the human eyes and also bringing a super-smooth touch feeling.

The blue-ray resisting glass protection sheet of the display screen disclosed in the present invention is described above in detail. Specific embodiments are applied in the utility mode for describing principles and implementation modes of the present invention. The description of the above embodiments is only used for helping to understand the present invention. Meanwhile, for those ordinary skilled in the art, specific implementation modes and application scopes may be changed based on the thought of the present invention. In conclusion, contents of the description shall not be interpreted as a limitation to the present invention.

I claim:

1. A blue-ray resisting glass protection sheet of a display screen, comprising: a glass substrate (4); wherein one side surface of the glass substrate (4) is atomized to form an atomization layer (1), an atomization surface of the atomization layer (1) is coated with a fingerprint resisting coating (3), the other side surface of the glass substrate (4) is coated with a blue-ray resisting coating (2), an A/B glue layer (5) is bonded to a surface of the blue-ray resisting coating (2), and a surface of the fingerprint resisting coating (3) is super smooth: wherein a range of a haze value of the atomization layer (1) is 3%-13%, and a transmittance of the atomization layer (1) is greater than 88%.

2. The blue-ray resisting glass protection sheet of the display screen according to claim 1, wherein transmittance parameters of the blue-ray resisting coating (2) are as follows: a corresponding transmittance at a wavelength of 380-400 nm is smaller than 45%; a corresponding transmittance at 450 nm is smaller than 45%; a corresponding transmittance at 480 nm is smaller than 70%; and a corresponding transmittance at a range of 550-650 nm is greater than 93%.

3. The blue-ray resisting glass protection sheet of the display screen according to claim 1, wherein a thickness range of a film of the fingerprint resisting coating (3) is 15-25 nm, a water contact angle is greater than 113°, and if repeated friction is performed for 3000 times on 0000# steel wool with a force of 1 kg, load, the water contact angle is greater than 100°.

4. The blue-ray resisting glass protection sheet of the display screen according to claim 1, wherein the glass substrate (4) is made of any glass material of soda-lime glass, high aluminum glass, corning gorilla glass or borosilicate glass.

5. The blue-ray resisting glass protection sheet of the display screen according to claim 1, wherein a surface friction coefficient of the fingerprint resisting coating (3) is smaller than 0.02.

\* \* \* \* \*